Patented July 16, 1935

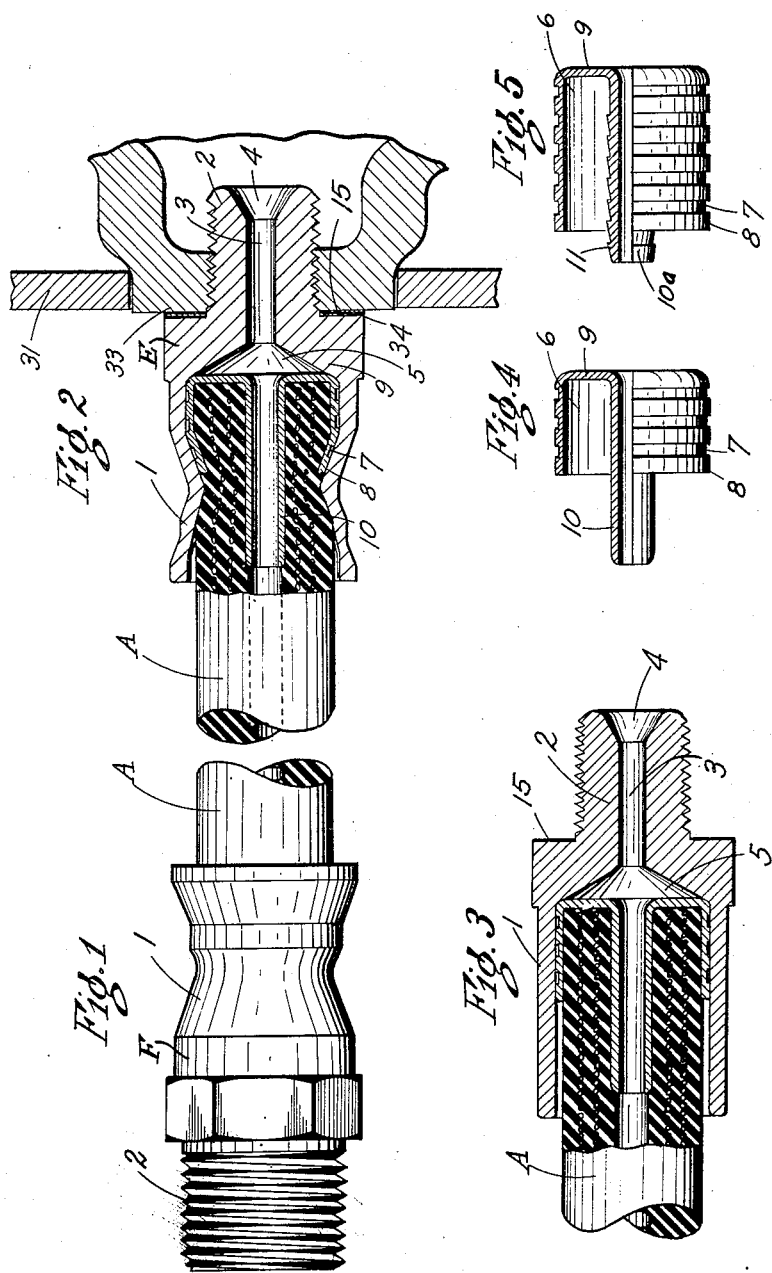

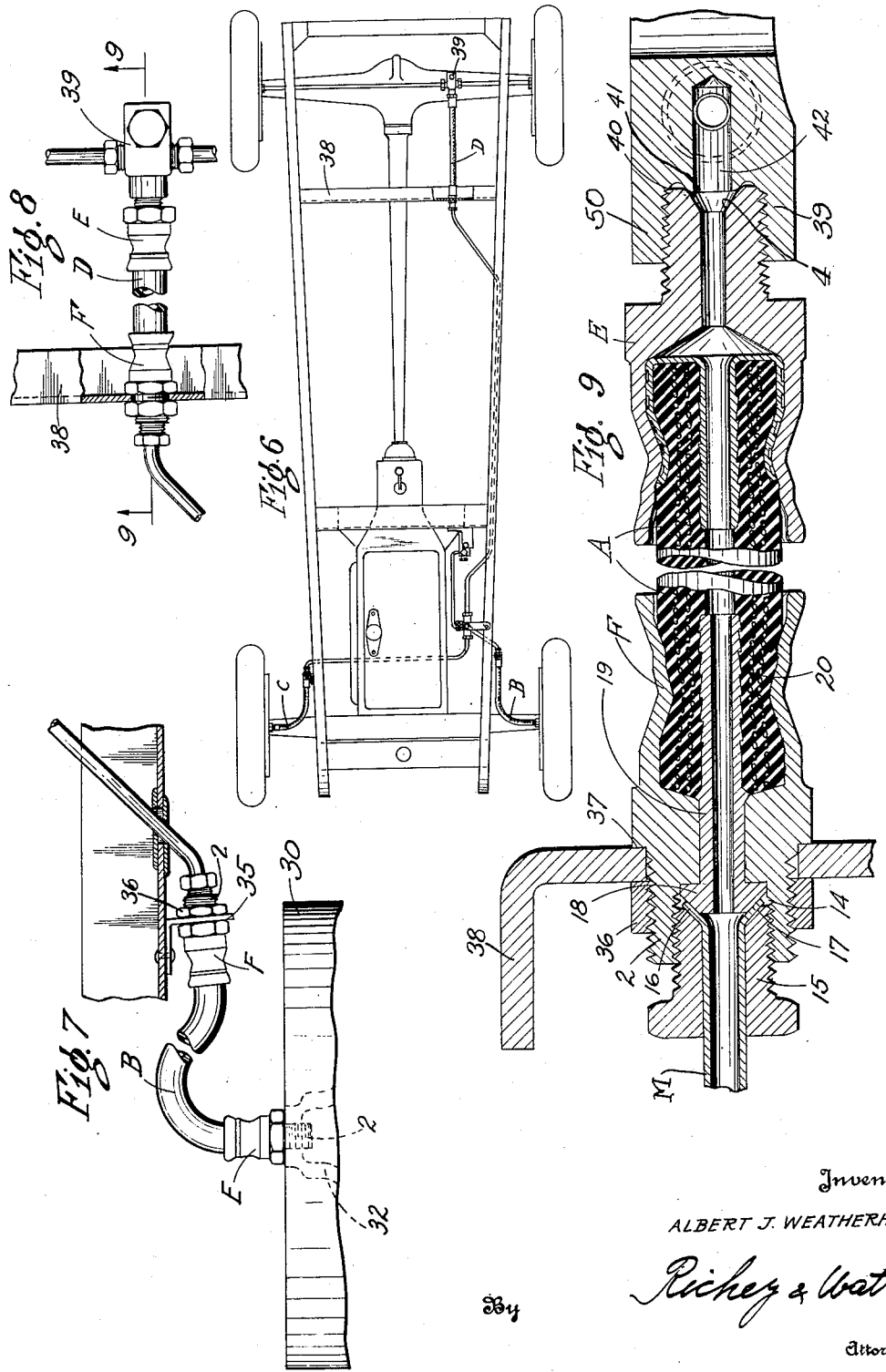

2,008,650

UNITED STATES PATENT OFFICE 2,008,650

HOSE COUPLING

Albert J. Weatherhead, Jr., Cleveland, Ohio, assignor to The Weatherhead Company, Cleveland, Ohio, a corporation of Ohio Application February 12, 1931, Serial No. 515,258
Renewed April 9, 1934

8 Claims. (Cl. 285—84)

This invention relates to couplings and more specifically to a novel structure for effecting a secure joint between a flexible hose and with means such as the cylinder of a hydraulic brake or a fitting interposed between such means and the hose coupling.

It is very desirable to provide a fluid line assembly which will successfully withstand any possibility of leakage of the force transmitting fluid, which might render the brakes inoperative that are dependent upon such force for actuation, and thus endanger the lives of persons relying thereon. Leakage is more often apt to occur at the coupling joints.

This invention contemplates the provision of a novel form of coupling that is adapted to be included in the hydraulic braking system of automotive vehicles. It is adapted to form a leakproof seal with the end of the hose as well as a secure and non-leaking joint with a brake cylinder or fitting to which it may be attached. In its preferred form, the coupling consists of a sleeve adapted to encompass the end of a flexible hose, and a thimble insertable into such sleeve to cover and protect the end of the hose. The external sleeve is compressed at a point intermediate its length to securely grip the hose to prevent the withdrawal thereof. In addition, the coupling is provided with a threaded stem adapted to be screwed directly into the brake cylinder or into a fitting. Two joints are offered to accommodate various types of fittings. In some instances a shoulder on the body of the coupling at the base of the stem forms the sealing surface, or, in other instances, a conical seat at the end of the coupling conduit serves this purpose. However, in either instance a good leakproof joint is obtained.

In the braking system illustrated herewith, the flexible hose part of the system lies between and is coupled to the copper tube piping system carried on the sprung part of the vehicle at one end and to the brakes themselves or to an auxiliary piping system which is mounted on an unsprung part of the vehicle. The hose coupling at the end adjacent the sprung part of the vehicle is secured to the chassis frame and in the embodiment of my invention shown herein this coupling serves the triple function of engaging the copper tube, engaging the rubber hose and also engaging a part of the vehicle frame.

Included among the objects of this invention is the desire to provide a union for joining a flexible fluid conducting hose or tube and a terminal of any nature whatsoever that not only will be effective as a seal against leakage but will, in addition, have sufficient strength to withstand tensional or torsional stress.

Another object of this invention is to provide a union for joining a flexible tube to the cylinder of a hydraulic brake or a fitting wherein rotting out or deterioration of the hose or tube resulting from leakage of liquid into the body or walls of such hose, will be completely eliminated.

Another object of this invention lies in the provision of a coupling which can be either connected directly to the cylinder of a hydraulic brake or to an adaptor or other fitting interposed between said cylinder or a fitting and the hose.

A further object of this invention is directed to the provision of an integral means for encompassing the inner and outer walls of the hose or tubing as well as the cut end thereof to thereby exclude the brake operating fluid from the walls or the body of the hose.

Still another object of this invention is to provide a coupling for a flexible tube or hose that will be effective to securely grip the hose to prevent the withdrawal thereof from such coupling in addition to providing a leakproof connection therebetween.

Still another object of this invention is to provide a simplified and more integral fluid braking system for vehicles wherein the use of my preferred form of coupling will result in the elimination of a number of parts, such as adapters, which have heretofore been found necessary with other types of coupling devices.

Other objects and advantageous features of this invention will be hereinafter brought out more in detail, reference being had to the accompanying drawings wherein like figures of reference designate corresponding parts, and wherein;

Fig. 1 is an elevation of my preferred form of coupling for one end of the hose showing the external appearance thereof.

Fig. 2 is a vertical longitudinal section through a preferred form of coupling for the other end of the hose and a portion of the cylinder of a hydraulic brake illustrative of the manner in which the outer sleeve of the coupling is compressibly reduced centrally to clamp the cut end of the tube.

Fig. 3 is a vertical longitudinal section of the coupling illustrated in Fig. 2 with the various parts in position prior to the compressing of the external sleeve.

Fig. 4 is a detail partly in section of a preferred form of internal sleeve member for enclosing the cut end of the tube.

Fig. 5 is a detail partly in section showing a modified form of internal sleeve.

Fig. 6 is a layout of a hydraulic brake system of a motor vehicle.

Fig. 7 is a detail of one of the front wheel brakes of the motor vehicle illustrated in Fig. 6, showing the part that my coupling plays in connecting a flexible tube between the brake cylinder and the main fluid line.

Fig. 8 is a detail illustrating the use of my couplings between the T-connection of the lateral fluid line for the rear wheel brakes and the main fluid line.

Fig. 9 is a section taken on the line 9—9 of Fig. 8.

Referring now to the drawings, I have shown in Figs. 1 and 2 and Fig. 9 two coupling devices designated respectively E and F. The coupling device E constitutes the preferred form of coupling and will be dealt with first.

This coupling may be machined from bar stock and includes a sleeve 1, the inner walls of which define a chamber having a bottom shaped in the form of the frustrum of a cone. The bottom of this chamber is bored to provide a fluid passage 3 in a threaded stem 2, the outer end of the stem being counterbored to form a flared end 4, adapted to co-operate with a conical seat 41 formed at the bottom of a threaded chamber 50, Fig. 9, in a fitting 39.

The sleeve 1 is adapted to encompass and embrace the cut end of a hose A and the union therebetween is established by reducing the diameter of the sleeve at some point intermediate its length, preferably by a process of spinning or rolling, as described and claimed in my Patent No. 2,000,680, issued May 7, 1935. Before the cut end of the hose is inserted in the sleeve, a thimble is inserted thereover to protect the exposed end of the hose from the deleterious effect of fluid seepage. The cup is also effective to produce a seal with the sleeve 1 further effective to prevent fluid under pressure from seeping between the walls and entering the cut end of the hose from behind.

More particularly, the thimble comprises a tubular skirt portion 6 provided with a plurality of external grooves 7 spaced by annular rings 8 that are effective to produce a seal with the inner surface of the sleeve 1 in a manner to be hereinafter described. The thimble is also provided with a radial wall 9 that has an integral nipple 10 extending into and beyond the end of the skirt 6. Hence, when the thimble is placed on the cut end of the tube, the nipple 10 embraces the wall of the hose passage, the sleeve 6 encompasses the external surface of the hose and the cut end abuts against the radial wall 9.

A slightly modified form of sleeve is shown in Fig. 5, wherein the skirt portion 6 is substantially twice the length of the skirt shown in Fig. 4, and the nipple 10a differs slightly over the nipple 10 by the provision of a plurality of annular barbs 11 adapted to prevent the withdrawal of the cap after it has been placed on the cut end of the hose.

Referring to Fig. 3, I have shown the hose A with the thimble disposed on the cut end thereof and the whole inserted in the sleeve 1 with the radial face 9 of the thimble abutting, along its marginal edge, against the conical bottom of the sleeve. It will be noted at this point that a pocket of considerable area is formed ahead of the radial face 9 that, when the device is operatively connected with a fluid transmitting system, offers means for building up a considerable head against the end of the thimble, which illustrates that it is of importance that a good seal be established else fluid leakage occur.

To join the hose to the coupling E, the sleeve 1 is rolled or spun inwardly at some point intermediate the ends thereof, preferably at a point just beyond the end of the skirt 6, as shown in Fig. 2, or at a point intermediate the length of the skirt where the cap of Fig. 5 is employed, as shown in Fig. 9, so that as the sleeve is pressed inwardly, the skirt will also be pressed inwardly and a reduction in diameter effected at the end or at a point in rear of the end if the thimble of Fig. 5 is employed.

When this operation is completed, assuming that the thimble of Fig. 4 is employed, it will be found that the hose will be compressed between the outer sleeve and the nipple at a point behind the end of the skirt. Further, the hose will be compressed between the nipple and the end of the skirt. A seal will also be effected between the sleeve 1 and each of the annular rings 8 formed on the exterior of the skirt. A seal will further be produced between the skirt and the coupling along the circumferential line where the radial face 9 of the thimble abuts against the bottom of the conical seat 5. If the cap of Fig. 5 is employed, the zone of greatest radial reduction will occur at a point intermediate the length of the sleeve.

When the sleeve 1 is rolled inwardly, a radial and inwardly directed pressure is effective to squeeze the hose between the sleeve and the nipple 10. The hose between this zone of pressure and the radial face 9 of the thimble expands radially as well as longitudinally and is compressed against the radial wall of the thimble which sets up a further seal between the hose and the thimble. In addition, the pressure exerted to roll the sleeve 1 inwardly is also effective to force the thimble forward to produce the seal hereinbefore mentioned between the radial wall 9 and the wall of the flared portion 5. It will be readily appreciated that a seal is effected between the coupling member 1 and thimble that will preclude the leakage of fluid under pressure therebetween even though a considerable head is built up against the radial part 9 of the thimble.

Referring now to Fig. 9, particularly to the coupling shown on the left hand side thereof, it will be noted that this coupling differs from the coupling E in that the thimble is dispensed with. This coupling, designated by F, is intended to be joined to the opposite end of the hose and where this hose is employed with a unit of a hydraulic braking system, extending from the sprung part of the vehicle to the unsprung part, this particular coupling device is intended to be attached to a bracket on the frame of the vehicle, whereas the other coupling E is intended to make a connection with the fitting 39 hereinafter referred to.

The coupling includes the sleeve 1, the bottom of which is concaved as shown and is bored to provide a conduit for the reception of a headed stem 19. The head of the stem 19, indicated by 18, lies at the bottom of the threaded chamber 16 formed in the threaded stem 2. A male member 15 having a flared conical end 17 is adapted to be sleeved on a tube M having a flared end adapted to be compressed against the seat 18.

The nipple 19 extends into the area defined by the sleeve F and is provided with barbs 20 adapted to engage with the hose A and to prevent withdrawal thereof. The hose is secured to the coupling member by inserting in the sleeve 1 with the cut end of the hose pressed firmly against the bottom thereof. The sleeve is then rolled at some point intermediate its length to a reduced diameter and the hose is compressed between the sleeve and the nipple. Here, the longitudinal pressure set up in the hose between the zone of radial pressure and the bottom of the chamber formed by the sleeve is effective to force the cut end of the hose firmly against the conical bottom to establish a tight seal therebetween.

As for applying my coupling to the hydraulic brake system of an automotive vehicle, I have shown in Fig. 6, a layout of such system and have designated the flexible tube connection to which my coupling is joined by the letters B, C and D. The tubes at B and C connect between the main fluid line and the cylinder of the brake drum, whereas the tube D connects across the main line and the lateral conduit supplying both rear wheel brakes.

To more clearly bring out the manner in which my couplings are incorporated in the fluid system, I have shown an enlarged detail of one of the front wheel brakes and the flexible tube B. The numeral 30 designates the brake drum enclosing the brake cylinder 32 mounted on the apron 31, Fig. 2. I preferably employ the type of coupling designated by the letter E and shown in Fig. 3, for the drum end of the tube end. As will be noted, the threaded stem 2 is screwed into a threaded aperture in the radial face 33 of the cylinder 32. A seal is effected between the coupling and cylinder by placing a gasket 34 on the stem 2.

The opposing end of the tube is connected to the main fluid system by means of the coupling F shown in Fig. 9. The threaded stem 2 is inserted through an aperture in an L member 35 secured to the frame and the nut 36 screwed up tight thereagainst to clamp the body of the L surrounding the aperture between such nut and the shoulder 37 of the coupling.

The flexible connection D between the hydraulic brake line and the lateral conduit supplying the rear wheel brakes is best shown in Fig. 9 wherein the tube is connected to the main line by means of the coupling F. This coupling is mounted in an aperture in the frame lateral 38 and the head of the coupling is clamped by the nut 36 in a manner similar to that just described with reference to main line connections of the tube B.

The opposing end of the tube is joined to a T connection 39 of the lateral fluid conduit by screwing the end of the coupling E, such as that shown in Fig. 2, into the threaded bore 40 of such coupling. However, in this instance, a seal is effected by the conical seat 4 underlying the threaded portion of the stem 2 engaging with a perforated conical seat 41 surrounding the end of passageway 42 rather than by the square ground surface 15 engaging with the radial face 33 of the brake cylinder as in Fig. 4. Thus, the coupling provides two sealing surfaces that will permit it to be readily adaptable to varying types of connection as evidenced by a comparison of Fig. 2 with Fig. 9.

The method of deforming the sleeves of the coupling members inwardly to secure the hose to the couplings is described and claimed in my Patent No. 2,000,680 issued May 7, 1935, while fittings or coupling members having inwardly deformed sleeves are claimed in my application Serial No. 17,937, filed April 24, 1935. Various novel features disclosed but not claimed herein are claimed in my divisional application Serial No. 26,932, filed June 17, 1935.

I claim:

1. In a coupling for the end of a flexible rubber hose having a fabric body portion, the combination of a member comprising a tubular part insertable within the bore of the hose and a sleeve part encompassing the exterior of the end of the hose, said tubular part being at least as long as said sleeve part, and a disc part integrally formed with said first named parts, and means including at least a portion of the body of the coupler bearing upon and pressing inwardly the said sleeve part of said member and gripping the hose end thereby, whereby fluid is excluded from the end of the hose.

2. A hose coupling including a coupling head having a sleeve the walls of which define a chamber having a conical bottom, a cup adapted to lie within said sleeve, said cup having a skirt adapted to encompass a hose and a radial wall against which the end of said hose abuts, said sleeve being adapted to be compressed on said skirt to seal said skirt against said hose and to seal said cup against the bottom of the chamber defined by said sleeve and compress the end of said hose against the radial wall of said cup.

3. A hose coupling including a coupling head having a sleeve integral therewith, a cup insertable in said sleeve and adapted to encompass a hose, said cup having a skirt and an integral radial wall, said wall having an integral nipple lying within the hose passage and extending beyond the end of the skirt, the skirt being provided with a plurality of annular rings, said sleeve being adapted to be compressed on said skirt to seal said skirt against said hose and compress said hose against said nipple, said skirt being longitudinally compressed against the coupling head.

4. In combination, a hose, a coupling therefor including a coupling head having a sleeve integral therewith, a cup insertible in said sleeve and adapted to encompass the hose, said cup having a skirt and an integral radial wall, said wall having an integral nipple lying within the hose passage, said sleeve being compressed on said skirt to seal said skirt against said hose and to compress said hose against said nipple, said nipple extending into the bore of the hose in the zone of compression of the wall thereof at least far enough to prevent any substantial reduction of the diameter of the bore of the hose due to contraction of the sleeve portion of said coupling member.

5. A hose coupling having a body portion and a sleeve projecting therefrom, the body portion and the sleeve defining a chamber having an end wall, a cup adapted to lie within said sleeve, said cup having a skirt adapted to encompass a hose and having a radial wall against which the end of said hose abuts and a nipple extending from said radial wall and adapted to project within the hose at least far enough to prevent substantial reduction of the diameter of the bore of the hose due to contraction of the sleeve of the coupling member, said sleeve being compressed on said skirt thereby to seal said cup against the bottom of the chamber defined by said sleeve, and to compress the hose between the skirt and the nipple to prevent fluid from reaching the end of the hose.

6. In a coupling for a flexible hose having displaceable walls, a thimble encompassing the end of the hose and having a central tubular part extending into the bore of the hose, a coupling member having a sleeve portion for receiving said thimble and said hose end, said sleeve portion being deformed inwardly to displace material of the bore into the thimble and to compress the wall of the hose against the tubular part of said thimble, said tubular part of said thimble extending into the bore of the hose and into the zone of compression of the wall thereof at least far enough to prevent any substantial reduction of the diameter of the bore of the hose due to contraction of the sleeve portion of said coupling member, said thimble being forcibly held in contact with the body of said coupling member when said sleeve is contracted.

7. In combination, a hose, a coupling therefor including a body portion having a sleeve integral therewith, said body portion and said sleeve defining a chamber having an end wall, an insert for preventing fluid from reaching the end of the hose comprising a nipple inserted within the hose and having a radial disc formed integrally with said nipple and adapted to engage the end of the hose, said sleeve being deformed inwardly against said hose and said insert to compress said hose against the nipple and to seal said insert against said sleeve, said nipple extending into the bore of the hose in the zone of compression of the wall thereof at least far enough to prevent any substantial reduction of the diameter of the bore of the hose due to the deformation of the sleeve portion of the coupling member.

8. In combination, a hose, a coupling therefor including a body portion having a sleeve integral therewith, said body portion and said sleeve defining a chamber for receiving the hose, means for preventing fluid from reaching the end of the hose comprising a nipple inserted within the hose and having a radial disc formed integrally with said nipple and adapted to engage the end of the hose, said sleeve being deformed inwardly to compress said hose against the nipple and to seal said disc against the bottom of the chamber defined by the sleeve, said nipple extending into the bore of the hose in the zone of compression of the wall thereof at least far enough to prevent any substantial reduction of the diameter of the bore of the hose due to the deformation of the sleeve portion of the coupling member.

ALBERT J. WEATHERHEAD, Jr.